Feb. 7, 1956  J. B. DICKSON  2,734,128
TRIM RING FOR LAMPS
Filed Oct. 4, 1952
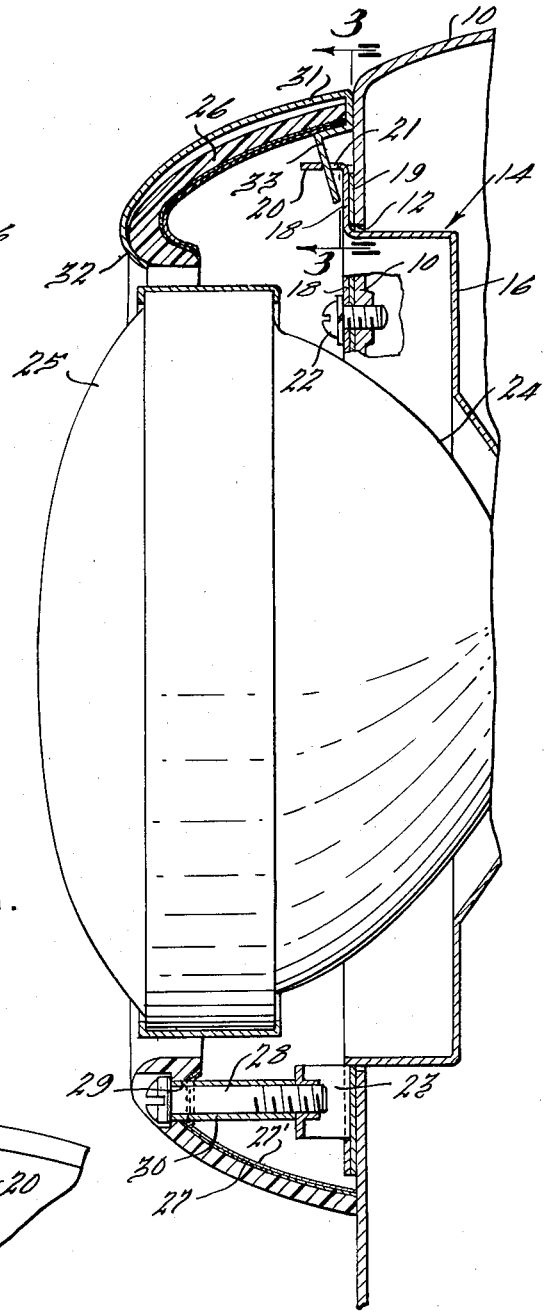
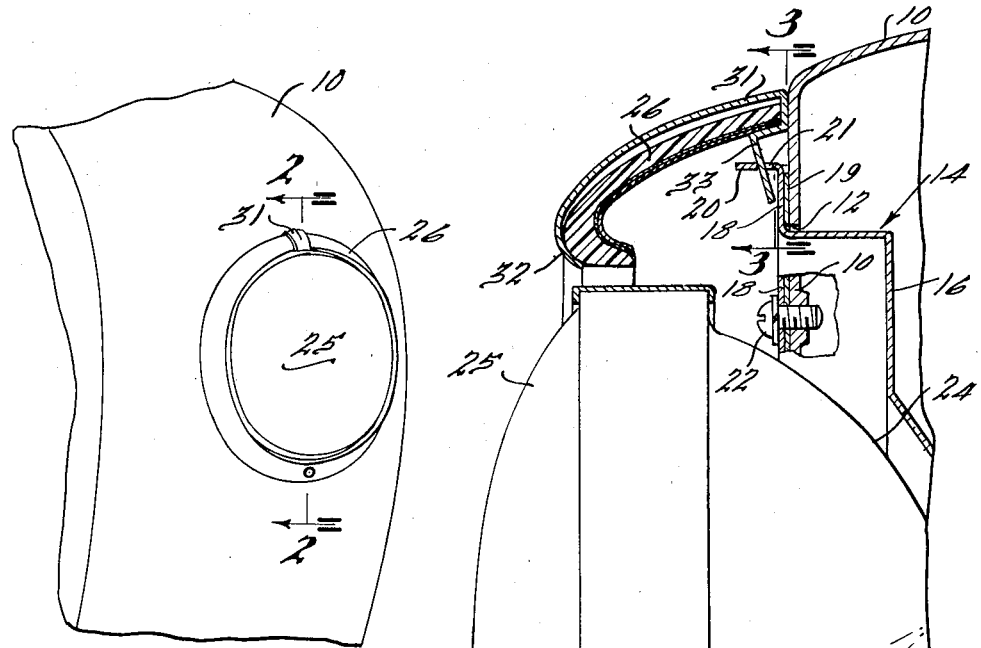
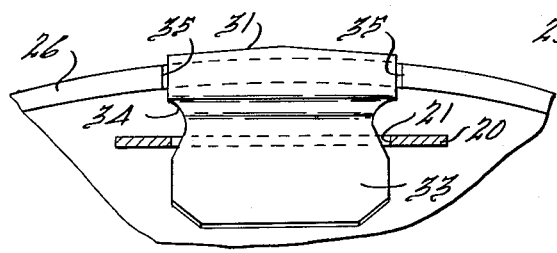
Fig. 1.
Fig. 2.
Fig. 3.
INVENTOR.
John B. Dickson.
BY Harness & Harris
ATTORNEYS.

United States Patent Office 2,734,128
Patented Feb. 7, 1956

2,734,128

TRIM RING FOR LAMPS

John B. Dickson, Highland Park, Mich., assignor to Chrysler Corporation, Highland Park, Mich., a corporation of Delaware Application October 4, 1952, Serial No. 313,141

1 Claim. (Cl. 240—41.55)

This invention relates to improvements in a trim ring or bezel and its application to a lamp.

The invention is illustrated and described in its application to a headlamp for a motor vehicle although in its broader aspect the invention can be utilized in other lamp structures.

An object of the invention is to provide a relatively light weight, economical trim ring or bezel which can be readily applied to a lamp and when so applied presents a pleasing appearance to the eye. Heretofore these rings have been metallic and the exposed surface thereof has been plated in order to present a pleasing appearance to the eye and to minimize corrosion. The plated surface is brought to the desired bright finish by a buffing operation.

In carrying out the foregoing object the improved ring is formed of transparent plastic and that surface of the ring opposite the normally exposed surface is coated with a film of vaporized metal with the result that the normally exposed surface presents a bright finish simulating the metallic luster of a highly polished metal surface, for example chrome. The aforesaid film does not require buffing or polishing in order to impart the desired effect to the exposed surface, but as a protective measure a coating of paint may be applied to such film. The appearance of the exposed surface of the plastic ring can be marred by marring the filmed surface, but the latter is not directly exposed and hence is not subjected directly to corrosive agents as is the plated surface of a metallic ring.

The invention provides a one-piece plastic ring which requires no surface finishing operations other than the application of the aforesaid film and, if desired, the coating of paint over the film.

The invention also includes the attachment of the aforesaid trim ring to a support to embellish the lamp and its associated structure, and a further object of the invention is to provide a detachable connection between the trim ring and its support which will not mar the appearance of the ring when the connection is made or during the making thereof. In effecting the foregoing, the connection as herein illustrated includes a clamp-like fastener which extends over and embraces the normally exposed surface of the trim ring for connection thereto and has a projection detachably engageable with a support. The fastener may be metallic and its exposed surface preferably matches the exposed surface of the ring in appearance.

Other objects and advantages of the invention will be more apparent from the following description taken in connection with the accompanying drawings, in which:

Fig. 1 is a fragmentary perspective view of a vehicle headlamp embodying the invention;

Fig. 2 is an enlarged elevational view, partly in section, taken on the line 2—2 of Fig. 1; and Fig. 3 is an enlarged elevational view, partly in section, taken on the line 3—3 of Fig. 2.

Referring to the drawings, the numeral 10 designates a front fender of a motor vehicle having an opening 12 in the front face thereof for receiving a lamp unit 14. This unit includes an open ended hollow support casing 16 having a portion extending through the fender opening 12 and an annular radially extending flange 18 overlapping the front face of the fender adjacent the opening 12 with an intervening seal 19. The flange 18 has an integral terminal flange 20 provided with a fastener receiving slot 21. The support casing 16 is secured to the fender at circumferentially spaced locations by screws one of which is illustrated at 22, engaged with flange 18 and fender 10. The flange 18, at the bottom of the unit as illustrated in Fig. 2, has a tongue-forming bracket 23 struck therefrom to provide a connection for the trim ring as hereinafter set forth.

The lamp unit includes the conventional bulb 24 and lens 25 of the sealed beam type commonly used for motor vehicles and is so well known that details thereof are omitted here for the sake of brevity. The bulb and lens part of the lamp unit are supported from the casing 16 and project outwardly from the fender and from the outermost portion of the casing 16, thus there is created an opening or gap which is substantially closed by a ring 26, and commonly referred to as a trim ring or door in the industry.

The ring 26 is formed of a clear plastic, is transparent and has a circumferential generally convex outer or exposed surface and a generally concave inner surface terminating in opposite edge portions as more particularly shown in Fig. 2. It will be understood that the contour of the ring 26, is preferably such that it will blend with the contour of the adjacent part of the fender. The inner surface has applied thereto a film or coating 27 of a vaporizable metal which produces a mirrored back, the coating being a specular reflector. Present day automobiles are embellished by providing a chrome plating for the exposed surface of certain components and in order that the plastic ring may simulate the color of a chrome surface, the film or coating 27 is preferably aluminum or silver, either of which is readily vaporizable and can be applied with facility. Other film producing metals or materials may be used and particularly for effecting another desired color appearance for the plastic ring. A protective coating 27' of paint or lacquer may be applied to the film 27.

By way of example, the plastic for the ring 26 may be methyl methacrylate which can be readily formed into a clear, transparent article by molding, although of course other plastic materials can be used.

The ring 26 is detachably connected adjacent the bottom of the lamp unit as viewed in Fig. 2 by a screw 28 which projects through an opening 29 in the ring and is threaded into an opening in the bracket 23 carried by the lamp casing 16. A sleeve 30 encircles the screw 28 and its opposite ends abut the head of the screw and bracket 23 to limit threading of the screw into the bracket and to thus prevent distortion of the plastic ring. Adjacent the upper part of the lamp unit, as viewed in Fig. 2, the ring 26 is provided with clamp-like fastener 31 embracing the ring for attachment thereto. In this respect the fastener extends over the exposed surface of ring 26 and has a hooked end 32 engaging a portion of the ring adjacent the inner diameter thereof, as shown in Fig. 2. The fastener also extends around the edge of the ring 26 at its outer diameter and inwardly over the inner concave surface of the ring and terminates in a radially inwardly extending projector 33 which extends through the slot 21 of the casing flange 20. The projection 33 is connected to the body of the clamp by a neck-like portion 34, as shown in Fig. 3 and is inclined from the vertical so that when the ring is assembled the projection 33 reacting against the bracket 20 tends to draw the ring 26 against the adjacent fender surface. This action also serves to cause the hooked end 32 to clamp against the ring 26. The outermost edge of the ring 26 has a notch between the walls 35—35, as shown in Fig. 3, in which the clamp 31 is received, this notch having a depth corresponding to the thickness of the clamp. By this arrangement the ring 26 as well as the clamp 31 have flush engagement with the adjacent surface of the fender 10, as shown in Fig. 2, and the location of the clamp on the ring is predetermined for registration of the projection 33 with the receiving slot 21.

The ring 26, as well as the clamp 31 has sufficient radial clearance with the lamp unit to accommodate adjustably positioning the unit to properly aim the light beam.

I claim:

In combination with a lamp and support, a trim ring of clear plastic material having circumferential inner and outer faces and terminal edge portions, a coating on said inner face producing a mirrored back, and means securing the ring to the support including a fastener extending over said outer face and having a hooked end in embracing engagement with the ring adjacent one of said terminal edge portions, the fastener defining a channel in cross section receiving the other of said terminal edge portions and including a projection extending outwardly of said channel and underlying said coated surface engaged in an opening of the support.

References Cited in the file of this patent

UNITED STATES PATENTS

| | | |
|---|---|---|
| 1,928,112 | Michel | Sept. 26, 1933 |
| 2,266,329 | Mead et al. | Dec. 16, 1941 |
| 2,281,643 | Wahlberg | May 5, 1942 |
| 2,518,437 | Amstutz | Aug. 15, 1950 |

FOREIGN PATENTS

| | | |
|---|---|---|
| 666,724 | Germany | Oct. 27, 1938 |